United States Patent
Joyce et al.

(10) Patent No.: US 10,322,570 B2
(45) Date of Patent: *Jun. 18, 2019

(54) LAMINATE MATERIAL BONDING

(71) Applicant: uBeam Inc., Santa Monica, CA (US)

(72) Inventors: Andrew Joyce, Venice, CA (US); Paul Reynolds, Issaquah, WA (US); Sean Taffler, Pacific Palisades, CA (US); Nicholas Lavada Nemeth, Santa Monica, CA (US); Adam Stephen Elhadad, Santa Monica, CA (US)

(73) Assignee: uBeam Inc., Marina del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,257

(22) Filed: Nov. 20, 2017

(65) Prior Publication Data

US 2018/0072035 A1 Mar. 15, 2018

Related U.S. Application Data

(63) Continuation of application No. 15/068,455, filed on Mar. 11, 2016, now Pat. No. 9,821,541.

(60) Provisional application No. 62/192,123, filed on Jul. 14, 2015.

(51) Int. Cl.
  *B32B 37/12* (2006.01)
  *B32B 17/00* (2006.01)
  *B32B 37/00* (2006.01)
  *B32B 37/10* (2006.01)

(52) U.S. Cl.
  CPC ............... *B32B 37/12* (2013.01); *B32B 37/10* (2013.01); *B32B 2037/1253* (2013.01); *B32B 2307/202* (2013.01); *B32B 2309/02* (2013.01); *B32B 2309/027* (2013.01); *B32B 2457/00* (2013.01)

(58) Field of Classification Search
  None
  See application file for complete search history.

(56) References Cited

U.S. PATENT DOCUMENTS 3,026,234 A 3/1962 Paul
3,799,802 A 3/1974 Schneble et al.
(Continued)

FOREIGN PATENT DOCUMENTS

WO WO-02091492 A2 11/2002

OTHER PUBLICATIONS

International Search Report and Written Opinion dated Oct. 3, 2016 as received in Application No. PCT/US2016/042137.

*Primary Examiner* — Shamim Ahmed
(74) *Attorney, Agent, or Firm* — Morris & Kamlay LLP

(57) ABSTRACT

Systems and techniques are provided for laminate material bonding. A bonding agent may be applied to a first layer. A second layer may be placed onto the bonding agent on the first layer to form a laminate material. The laminate material may be placed between a first piece of non-compliant material with a first piece of compliant material and a second piece of non-compliant material with a second piece of compliant material. The laminate material may be in contact with the first piece non-compliant material and the second piece of non-compliant material. Pressure may be applied to the laminate material by applying pressure to the first piece of compliant material for a curing time of the bonding agent.

10 Claims, 7 Drawing Sheets

(56) References Cited

U.S. PATENT DOCUMENTS

| | | | |
|---|---|---|---|
| 4,087,300 A * | 5/1978 | Adler | B32B 15/08 |
| | | | 156/184 |
| 4,514,247 A | 4/1985 | Zola | |
| 4,751,146 A | 6/1988 | Maeda et al. | |
| 4,786,837 A | 11/1988 | Kalnin et al. | |
| 5,018,267 A * | 5/1991 | Schoen | B32B 37/0038 |
| | | | 156/295 |
| 2001/0029119 A1 | 10/2001 | Chung | |
| 2003/0049454 A1 | 3/2003 | Araki et al. | |
| 2004/0029311 A1 | 2/2004 | Snyder et al. | |
| 2004/0247921 A1 | 12/2004 | Dodsworth et al. | |
| 2007/0016053 A1 | 1/2007 | Lo et al. | |
| 2007/0218404 A1 | 9/2007 | Watanabe | |
| 2009/0250440 A1 | 10/2009 | Yap et al. | |
| 2010/0224395 A1 | 9/2010 | Higashitani | |
| 2013/0112459 A1 | 5/2013 | Aoshima et al. | |

\* cited by examiner

LAMINATE MATERIAL BONDING

CROSS REFERENCE TO RELATED APPLICATIONS

This application claims priority to, U.S. Provisional Patent Application No. 62/192,123, filed on Jul. 14, 2015.

BACKGROUND

Electromechanically active devices may be used in a variety of applications. For example, electromechanically active devices may be used in transducers, sensors, and actuators. Electromechanically active devices may be made from various materials that may be bonded together and may also include various electrical connections, forming a laminate material. Bonding techniques may result in depoling an active component of the laminate material due to high temperatures, large mechanical strains, or large electric fields used during bonding, requiring that the active component be repoled to allow an electromechanically active device made from the laminate material to function properly.

BRIEF SUMMARY

According to an implementation of the disclosed subject matter, a bonding agent may be applied to a first layer. A second layer may be placed onto the bonding agent on the first layer to form a laminate material. The laminate material may be placed between a first piece of non-compliant material with a first piece of compliant material and a second piece of non-compliant material with a second piece of compliant material. The laminate material may be in contact with the first piece non-compliant material and the second piece of non-compliant material. Pressure may be applied to the laminate material by applying pressure to the first piece of compliant material for a curing time of the bonding agent.

A conductive epoxy may be applied to a passive layer including an electrically passive material. An active layer including an electrically active material may be placed onto the conductive epoxy on the passive layer to form a laminate material. A bonding stock including the laminate material, a first quartz plate, a second quartz plate, a first neoprene rubber sheet, and a second neoprene rubber sheet, may be formed. The second quartz plate may be on top of the second neoprene rubber sheet, the laminate material may be on top of the second quartz plate, the first quartz plate may be on top of the laminate material, and the first neoprene rubber sheet may be on top of the first quartz plate. Pressure may be applied to the laminate material by applying pressure to the first neoprene rubber sheet for a curing time of the conductive epoxy.

Systems and techniques disclosed herein may allow for laminate material bonding. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
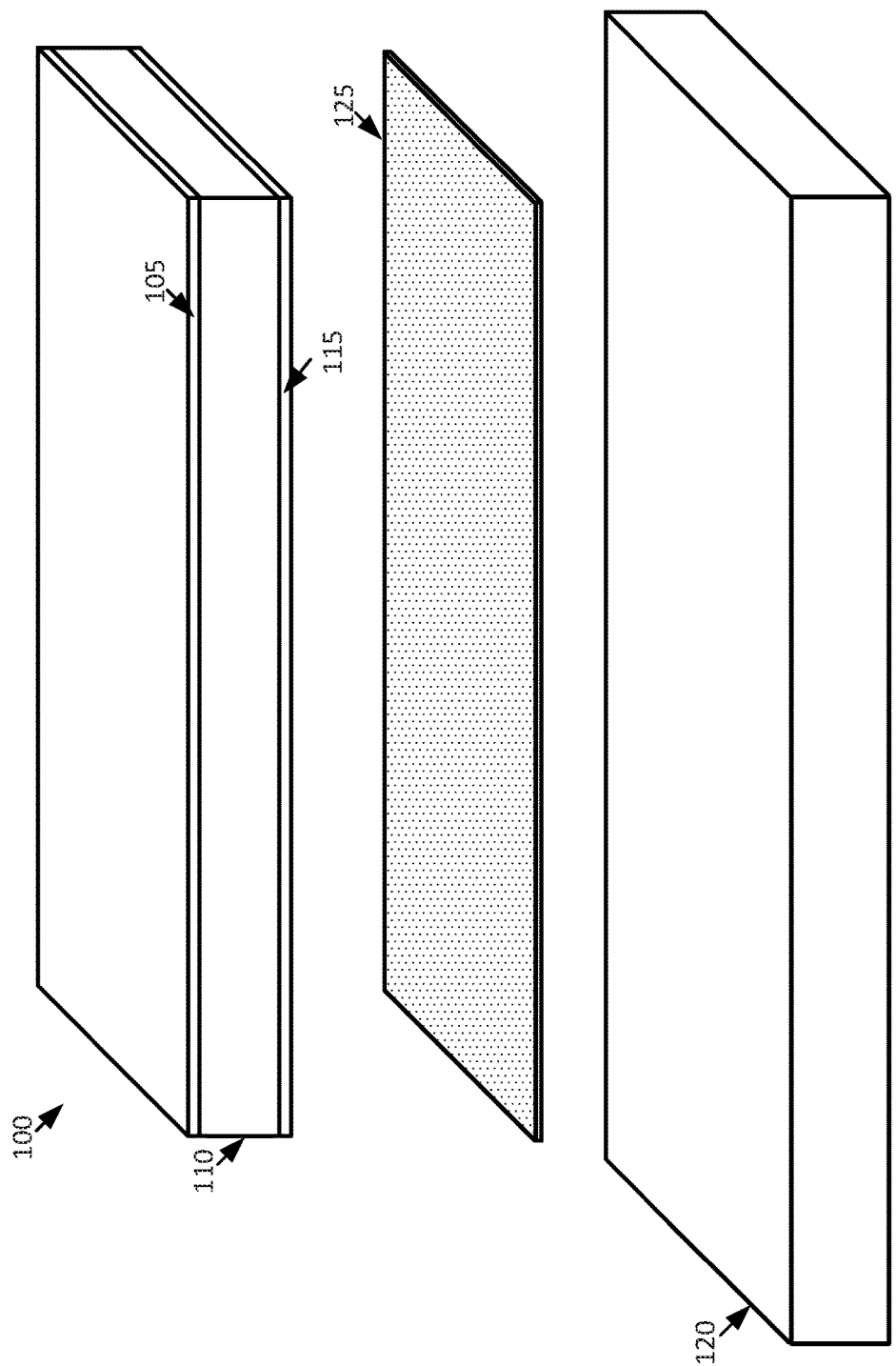
FIG. 1 shows an example laminate material according to an implementation of the disclosed subject matter.

According to embodiments disclosed herein, laminate material bonding may allow for the bonding of an electrically active material without depoling the electrically active material.

A laminate material may include an active layer and a passive layer. An epoxy may be applied to a surface of the passive layer. The active layer may be placed onto the passive layer to create a laminate material. The laminate material may be placed in a press in between quartz plates. A neoprene rubber sheet may be placed on the other side of each quartz plate from the laminate material, and each neoprene rubber sheet may be between a quartz plate and a steel plate. One of the steel plates may be attached to a pneumatic cylinder, and the other steel plate may be part of, or attached to, the bottom surface of the press. The pneumatic cylinder may be used to apply pressure to the laminate material through the steel plate, neoprene rubber sheet, and quartz plate. The laminate material may be left under pressure for a suitable period of time to allow the epoxy between the active layer and passive layer to cure.

A laminate material may include active layers and a passive layers held together using any suitable combination of conductive and non-conductive bonding materials. For example, a laminate material may include an active layer made of an electrically active material, such as, for example, piezoelectric ceramic, with an electrode on the top and bottom of the active layer, and a passive layer made of an electrically passive material, such as, for example, metals, including aluminum, stainless steel, and brass. The active layer may be electrically non-conductive, and the passive layer may be electrically conductive. The active and passive layers of the laminate material may be bonded together using any suitable bonding agent, such as an epoxy. The laminate material may be, for example, a piezoelectric unimorph that may be used to create flexures, or cantilevers, for an ultrasonic transducer.

To create a laminate material, an active layer and a passive layer may be bonded together with a bonding agent. The electrodes of the active layer, for example, electrodes on a piece of piezoelectric material such as piezoceramic, may be gold. The electrodes may be degreased and cleaned in any suitable manner, for example, using acetone, methanol, and isopropanol, or any other suitable solvents. The passive layer may be etched with acid, such as, for example, hydrochloric acid, in any suitable manner and for any suitable length of time. For example, the passive layer may be aluminum, and may be etched in a 20% chromic acid bath for between 10 and 40 minutes. Abrasion or lapping may also be used on the surfaces of the active layer and the passive layer. For example, the passive layer may be abraded with sandpaper, steel wool, or an abrasive cleaning pad. The passive layer may have a metal film deposited on its surface to eliminate the etching on the passive layer resulting from the acid used to etch the passive layer.

An epoxy, or other suitable bonding agent, may be used to bond the active layer and passive layer together to form the laminate material. The epoxy may be a conductive epoxy which may create a conductive path between the passive layer, which may be a conductive material, and an electrode of the active layer. For example, the epoxy may be a silver conductive epoxy or anisotropic conductive adhesive. A conductive epoxy for bonding the active layer and the passive layer may be chosen based on any suitable criteria, such as, for example, resistivity, cure schedule, viscosity, and properties of the epoxy after is has cured. The epoxy may have a resistivity such that the epoxy forms a conductive bond after being cured, allowing the cured epoxy to conduct electricity between the passive material and an electrode of the active material. The epoxy may have a cure schedule which allows the active layer and passive layer of the laminate material to stay below 90 degrees Celsius while the epoxy bonding them together is cured. The epoxy may be screen-printable or spreadable, or may be able to be applied using any other suitable type of application. The epoxy may have any suitable particle size. For example, the epoxy may have a maximum particle size of 30 micrometers, which may allow for the regulation of the thickness of the bond formed by curing the epoxy when pressure is applied to the laminate material during curing of the epoxy. The epoxy may have any suitable cure cycle. For example, the cure cycle for the epoxy may take 24-48 hours at room temperature. The epoxy may be loaded with carbon nanotubes. Bonding agents other than epoxy may be used to bond the active layer and the passive layer. For example, any suitable material which may be used to form a conductive bond may be used.

A layer of the epoxy may be spread across the surface of either the active layer or the passive layer. For example, conductive epoxy may be applied to the passive layer using screen printing techniques. A stencil may be stretched over the surface of the passive layer to which the epoxy will be applied. The stencil may be pressed into the surface of the passive layer. The stencil may be of any suitable thickness, and may be, for example, thicker than the particle size of the epoxy. For example, the epoxy may have a maximum particle size of 30 micrometers, and the stencil may be 38 micrometers thick. The stencil may be, for example, from 10 micrometers to 75 micrometers thick, depending on the particle size of the epoxy. This may ensure that the layer of epoxy, and the bond formed by curing the epoxy, is thicker than the maximum particle size of the epoxy. The stencil may be in any suitable shape and may include any suitable stencil pattern. For example, the stencil may include a single open aperture, or a number of open apertures of any suitable shapes, such as, for example, hexagons, squares, or circles, in any suitable pattern. Any suitable object, such as a solid straight edge or a rubber-backed squeegee, may be used to apply and level the epoxy on the passive layer using the stencil. In some implementations, the epoxy may be applied to an electrode of the active layer using the stencil in lieu of, or in addition to, the application of epoxy to the passive layer. The surface of the passive layer that will be bonded to the active layer may have a larger surface area than the surface of the active layer to which the surface of the passive layer will be bonded. The epoxy may be applied to an area of this surface of the passive layer that is the same size as the surface of the active layer to which the passive layer will be bonded.

The layer without epoxy may be placed onto the layer to which epoxy was applied to from the laminate material. For example, the active layer may be placed onto the epoxy on the passive layer. The placement may be done in any suitable manner. For example, suction devices used for surface mount device (SMD), or vacuum pickup tools, may be used to place the active layer onto the passive layer. Placement of the passive layer using suction devices may eliminate air pockets in the epoxy so that there are no air pockets in the bond formed by the epoxy after curing. Light pressure may be applied to the layer that has been placed onto the epoxy to ensure that the layer makes adequate contact with the epoxy. For example, light pressure may be applied to the active layer to ensure contact between the electrode of the active layer and conductive epoxy on the surface of the passive layer.

The laminate material, including the active layer and passive layer and uncured epoxy, may be placed into a press. The laminate material may be placed between two pieces of a non-compliant material. For example, the laminate material may be placed between two quartz plates. The quartz plates may have any suitable shape, for example, circular, and may have a surface larger than the surface of the laminate material that the quartz plates will be in contact with. The quartz plates may be machined flat, may be optically flat, and may be of any suitable thickness. The pieces of non-compliant material may be placed in between two pieces of a compliant material. For example, the quartz plates with the laminate material in between them may be placed in between two hard neoprene rubber sheets, such that a hard neoprene rubber sheets is in contact with the surface of a quartz plate opposite the surface of the quartz plate in contact with the laminate material. A material, such as talcum powder, may be placed between each hard neoprene rubber sheet and each quartz plate to prevent the quartz plates from bonding to the hard neoprene rubber sheets. The two pieces of compliant material, two pieces of non-compliant material, and laminate material may be placed in between two plates of a non-compliant material, such as, for example, steel. For example, the hard neoprene rubber sheets, quartz plates, and laminate material may be placed between two steel plates, with the neoprene rubber sheets each in contact with one of the steel plates.

Pressure may be applied to the laminate material. For example, one of the steel plates may be part of, or attached to, the bottom of a press, and the other steel plate may be attached to a pneumatic cylinder at the top of the press. The pneumatic cylinder may be used to apply pressure to the laminate material through the steel plate, hard neoprene rubber sheet, and quartz plate, pressing the passive layer toward the active layer. The hard neoprene rubber sheets may ensure the planarity of the force applied from the steel plate to the quartz plate. Any suitable level of pressure may be used. For example, the pressure applied to the laminate material may be selected so as to not crack the material of the active layer, which may be piezoceramic. For example, the pneumatic cylinder may be used to apply 1 atmosphere of pressure to the laminate material. The applied pressure may be varied from 0.1 atmospheres to 5 atmospheres. The laminate material may be left under pressure at room temperature for the curing time of the epoxy between the active layer and the passive layer. For example, the laminate material may be left under pressure for 24 to 48 hours. In some implementations, elevated temperatures may be used during the curing of the epoxy, for example, for the entire time the laminate material is under pressure, or at the end of the cure cycle for the epoxy. For example, the laminate material may be left under pressure for 12 hours, and then may be baked for 1 hour at 65 degrees Celsius. The elevated temperature used during curing of the epoxy may be lower than the Curie temperature of the active layer of the laminate material to prevent depoling of the active material.

In some implementations, a spacer may be placed around the laminate material. The spacer may be any suitable material and any suitable shape, and may be as thick as the desired thickness for the laminate material after the epoxy has cured. The use of the spacer may ensure that the pressure applied to the laminate material may not result in the laminate material being thinner than the spacer. The spacer may act as hard stop, for example, preventing the quartz plates from coming closer together than the thickness of the spacer while pressure is applied in the press. This may allow the spacer to be used to regulate the thickness of the bond, and of the laminate material, during the curing cycle for the epoxy.

In some implementations, two active layers may be bonded together to form the laminate material. For example, two pieces of piezoceramic may be bonded together to form a bimorph. The bonding of two active layers may use a non-conductive bonding agent, such as, for example, a non-conductive epoxy. For example, the piezoceramic pieces may be through-plated. In some implementations, the laminate material may include additional active or passive layers. For example, the laminate material may include a passive layer with active layers bonded on either side of the passive layer.

FIG. 1 shows an example laminate material according to an implementation of the disclosed subject matter. A laminate material 100 may include an active layer 110 and a passive layer 120. The active layer 110 may be any suitable material that may be electrically active, including, for example, a piezoelectric material such as a piezoceramic. The material of the active layer 110 may be electrically non-conductive. The active layer 110 may include a top electrode 105 and a bottom electrode 115. The top electrode 105 and the bottom electrode 115 may be made of any suitable material, such as, for example, gold, and may be attached or added to the material of the active layer 110 in any suitable manner. The passive layer 120 may be any suitable passive material, including, for example, metals such as aluminum, stainless steel, and brass. The material of the passive layer 120 may be an electrically conductive material. The active layer 110 may electrically separate the top electrode 105 from the bottom electrode 115. The passive layer 120 may be bonded to the active layer 110 at the bottom electrode 115 to form the laminate material 100.

The bond may be made in any suitable manner, including, for example, through the use of a conductive epoxy 125.

The top electrode 105 and the bottom electrode 115 may be cleaned using any suitable solvents or cleaning processes. For example, the top electrode 105 and bottom electrode 115 may be cleaned and degreased using acetone, methanol, and isopropanol. The passive layer 120 may be etched using an acid, such as, for example hydrochloric acid. For example, the passive layer 120 may be etched in a 20% chromic acid bath for between 10 and 40 minutes. This may etch the surfaces of the passive layer 120, which may allow for better adhesion of the conductive epoxy 125. The passive layer 120 may also be abraded using sandpaper, steel wool, an abrasive cleaning pad, or other abrasive. In some implementations, a metal film may be deposited on the passive layer 120 to eliminate the acid etch.

Figure 2:
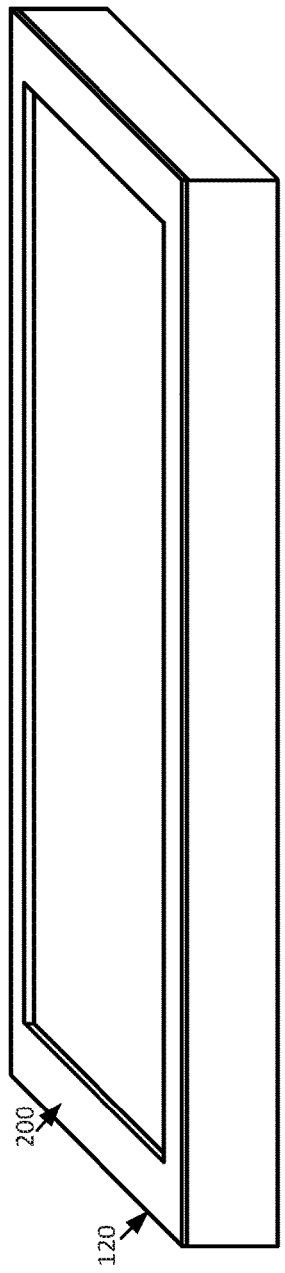
FIG. 2 shows an example layer of a laminate material according to an implementation of the disclosed subject matter.

FIG. 2 shows an example layer of a laminate material according to an implementation of the disclosed subject matter. A stencil 200 may be placed on the passive layer 120. The stencil 200 may include any suitable pattern of openings, including, for example, a single open aperture. The stencil 200 may have any suitable thickness, and may be, for example, between 10 micrometers and 75 micrometers thick. The thickness of the stencil 200 may be based on, for example, the particle size of the conductive epoxy 125. For example, if the conductive epoxy 125 has a particle size of 30 micrometers, the stencil 200 may have a thickness of 38 micrometers.

Figure 3B:
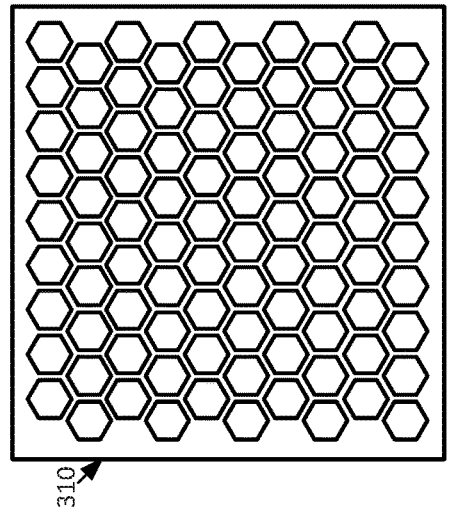
FIGS. 3A and 3B show example stencils according to an implementation of the disclosed subject matter.
Figure 3A:
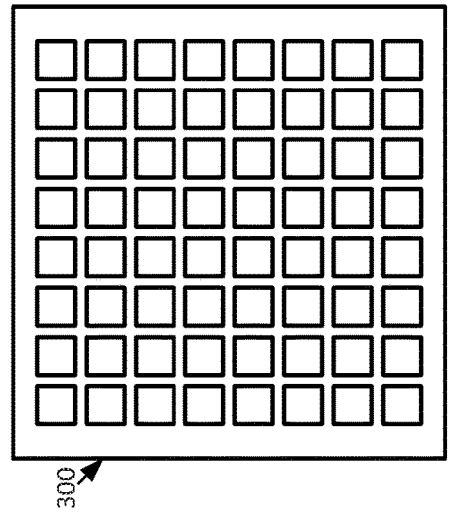

FIGS. 3A and 3B show example stencils according to an implementation of the disclosed subject matter. The stencil 300 may have openings in a grid pattern. The stencil 310 may have openings in a hexagonal pattern. The openings may be any suitable shape, including, for example, squares, hexagons, octagons, triangles, and circles. The openings may be any suitable size, and there may be any suitable amount space between the openings. The openings on the same stencil may be the same size, or may vary in size. The properties and arrangement of the openings may be selected to allow epoxy applied through the openings of the stencil to be spread evenly onto a surface, such as the surface of the passive layer 120, such that there may be no air gaps in the bond formed between the active layer 110 and the passive layer 120 by the conductive epoxy 125.

Figure 4:
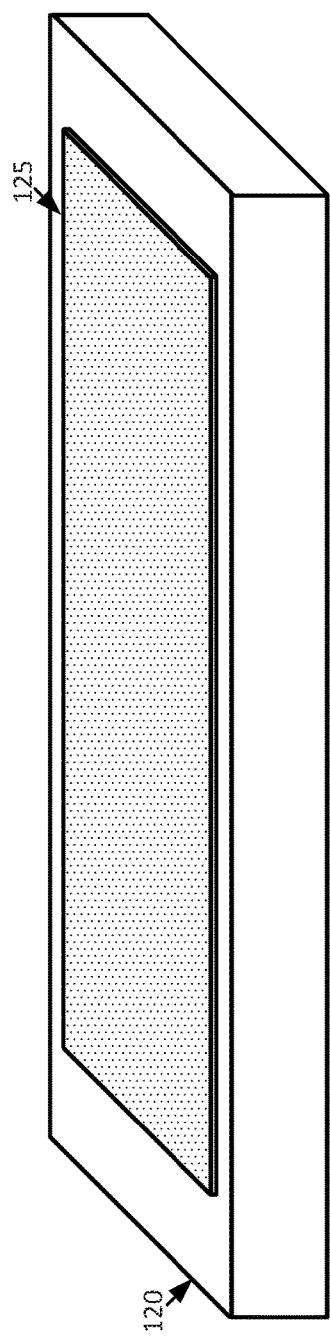
FIG. 4 shows an example layer of a laminate material according to an implementation of the disclosed subject matter.

FIG. 4 shows an example layer of a laminate material according to an implementation of the disclosed subject matter. The conductive epoxy 125 may be applied to the surface of the passive layer 120. For example, the conductive epoxy 125 may be spread onto the passive layer 120 with screen printing techniques, for example, using the stencil 200 and a rubber-backed squeegee or solid straight edge. The conductive epoxy 125 may be applied to the thickness of the stencil 200. For example, if the stencil 200 has a thickness of 38 micrometers, the conductive epoxy 125 may be applied to a thickness of 38 micrometers. The conductive epoxy 125 may applied as evenly as possible, such that the conductive epoxy 125 has an even thickness over the surface of the passive layer 120. The stencil 200 may be removed after application of the conductive epoxy 125 to the passive layer 120.

The conductive epoxy 125 may be any suitable epoxy of any suitable particle size. For example, the conductive epoxy 125 may have a maximum particle size of 30 micrometers. Other suitable bonding agents may also be used instead of conductive epoxy. The conductive epoxy 125 may be an epoxy that is electrically conductive after being cured. The conductive epoxy 125 may have a cure schedule that allows the laminate material 100 to stay below 90 degrees Celsius during curing. In some implementations, a non-conductive epoxy may be used instead of the conductive epoxy 125, or may be used along with the conductive epoxy 125. For example, both the conductive epoxy 125 and non-conductive epoxy may be used to define conductive epoxy structures in the bond while forming the rest of the bond with non-conductive epoxy.

Figure 5:
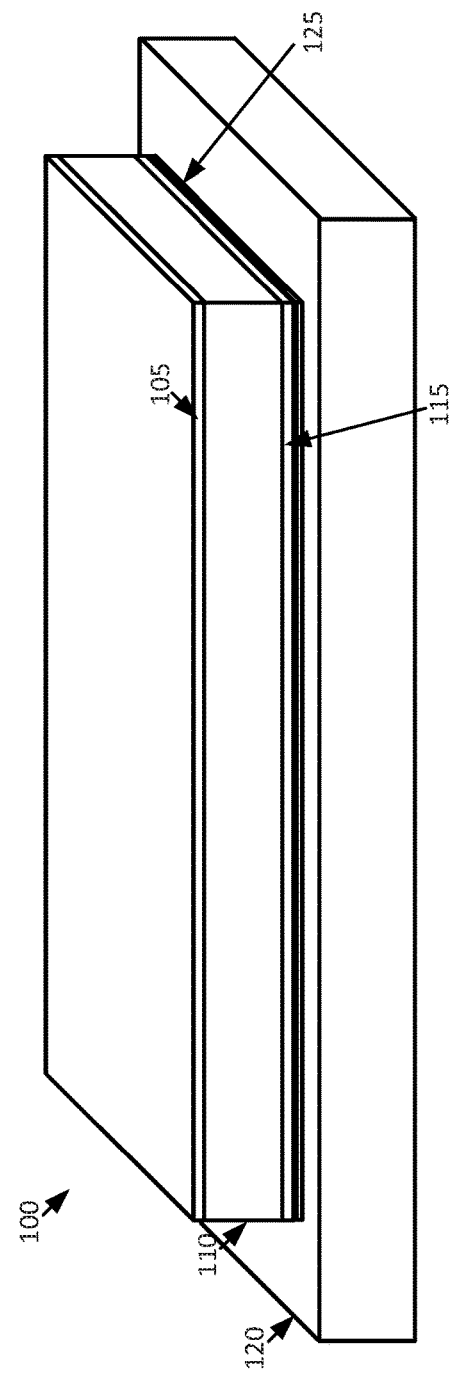
FIG. 5 shows an example laminate material according to an implementation of the disclosed subject matter.

FIG. 5 shows an example laminate material according to an implementation of the disclosed subject matter. The active layer 110 may be placed onto the conductive epoxy 125 that has been applied to the passive layer 120. The active layer 110 may be place using any suitable tool, such as, for example, a vacuum device or SMD suction cup. The active layer 110 may be placed so as to minimize air gaps in the bond formed by curing the conductive epoxy 125. Light pressure may be applied to the active layer 110 after it has been placed onto the conductive epoxy 125 on the passive layer 110. This may help ensure adequate contact between the bottom electrode 115 of the active layer 110 and the conductive epoxy 125.

Figure 6:
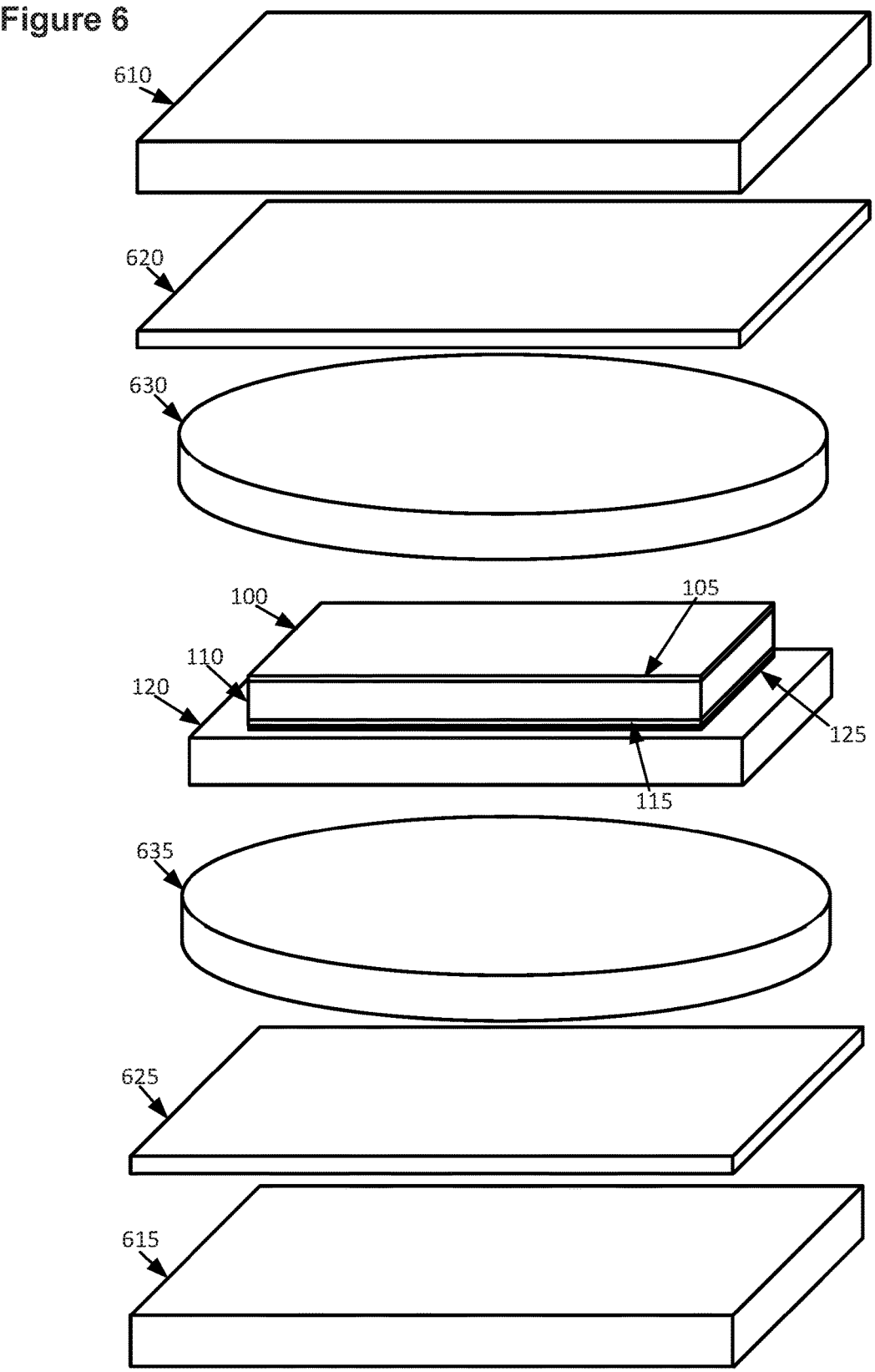
FIG. 6 shows an example laminate material bonding stack according to an implementation of the disclosed subject matter.

FIG. 6 shows an example laminate material bonding stack according to an implementation of the disclosed subject matter. The laminate material 100, including the active layer 110 placed onto uncured conductive epoxy 125 on the passive layer 120, may be placed between two pieces of a non-compliant material. For example, the laminate material 100 may be placed in between quartz plates 630 and 635. The quartz plates 630 and 635 may be any suitable size, shape, and thickness, and may be, for example, circular, optically flat, and may have bottom and top surface areas large enough to fully cover the bottom and top of the laminate material 100. The quartz plates 630 and 635 may be the same size and shape. The bottom of the passive material 120 may be placed onto the quartz plate 635, and the quartz plate 630 may be placed on top of the top electrode 105 of the active material 110.

The two pieces of non-compliant material and the laminate material 100 between them may be placed in between two pieces of compliant material. For example, the quartz plates 630 and 635 with laminate material 100 between them may be placed in between two hard neoprene rubber sheets 620 and 625. The hard neoprene rubber sheets 620 and 625 may be any suitable size and shape, and may, for example, have surfaces with a larger surface area than the top or bottom surfaces of the quartz plates 630 and 635. The bottom of the quartz plate 635 may be placed onto the hard neoprene rubber sheet 625, and the hard neoprene rubber sheet 620 may be placed on top of the quartz plate 630. Talcum powder, or another suitable material, may be placed in between the hard neoprene rubber sheet 620 and the quartz plate 630 and in between the hard neoprene rubber sheet 625 and the quartz plate 635 to prevent bonding between the hard neoprene rubber sheets 620 and 625 and the quartz plates 630 and 635.

The two pieces of compliant material, the two pieces of non-compliant material, and the laminate material 100 between them may be placed between two steel plates. For example, the hard neoprene rubber sheets 620 and 625, quartz plates 630 and 635, and the laminate material 100 between them may be placed between steel plates 615 and 610. The steel plates 610 and 615 may be any suitable size and shape, and may, for example, have surface areas the same as or larger than the surfaces of the top or bottom surfaces of the hard neoprene rubber sheets 620 and 625. The steel plates 610 and 615 may be machined flat. The steel plate 610 may be attached, directly or indirectly, to the pressure providing device of a press, such as, for example, a pneumatic cylinder. The steel plate 615 may be, or may be attached to, the bottom of a press. The hard neoprene rubber sheet 625 may be placed on top the steel plate 615, and the hard neoprene rubber sheet 620 may be underneath the steel plate 610.

Figure 7:
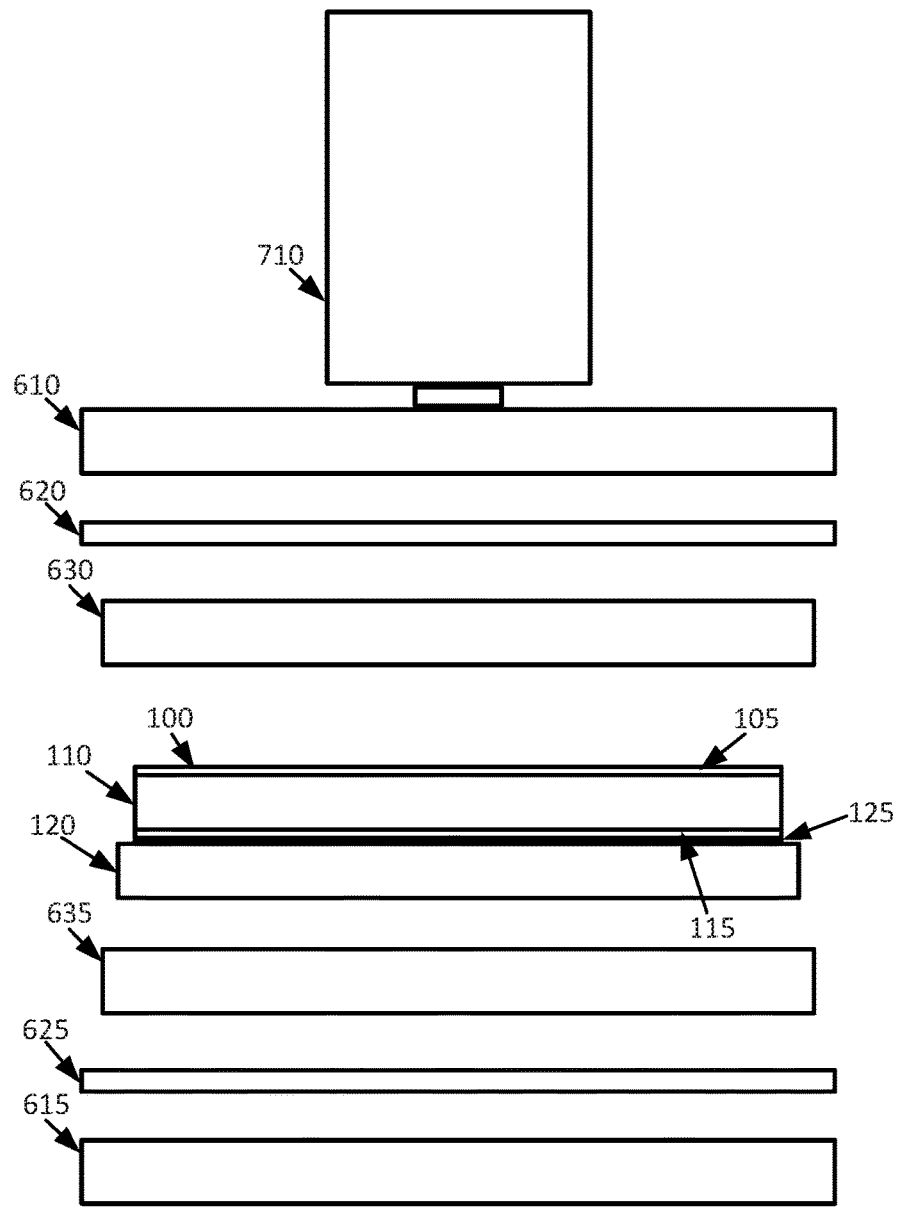
FIG. 7 shows an example laminate material bonding stack according to an implementation of the disclosed subject matter.

FIG. 7 shows an example laminate material bonding stack according to an implementation of the disclosed subject matter. The steel plate 615 may form the base of the stack used for bonding the laminate material 100. The hard neoprene rubber sheet 625 may be on top of the steel plate 615. The quart plate 635 may be on top of the hard neoprene rubber sheet 625. The laminate material 100 may be on top of the quartz plate 635, with the passive material 120 resting on the quartz plate 635. The quartz plate 630 may be on top of the laminate material 100, resting on the top electrode 105 of the active layer 110. The hard neoprene rubber sheet 620 may be on top of the quartz plate 630, and beneath the steel plate 610, which may be attached to a pneumatic cylinder 710. In some implementations, the steel plate 610 may not be in contact with the hard neoprene rubber sheet 620 until the pneumatic cylinder 710 is used to apply pressure to the stack through the steel plate 610.

In some implementations, the active layer 110 of the laminate material 100 may rest on the quartz plate 630. For example, when the laminate material 100 is a bimorph, both layers of the laminate material 100 may be active layers which may be in contact with the quartz plates 630 and 635 in the stack.

In some implementations, a spacer may be added to the stack. The spacer may be placed around the laminate material 100, between the quartz plates 630 and 635, and may regulate how close the quartz plates 630 and 635 may get to each other under pressure. This may allow for regulation of the thickness of the laminate material 100 and of the bond formed by the conductive epoxy 125, as the quartz plates 630 and 635 may not compress laminate material 100 to be thinner the spacer.

The stack may be built in any suitable manner. For example, the components of the stack may be added from the bottom up, starting with the steel plate 615. Components may also be stacked separately, then placed on the steel plate 615.

Figure 8:
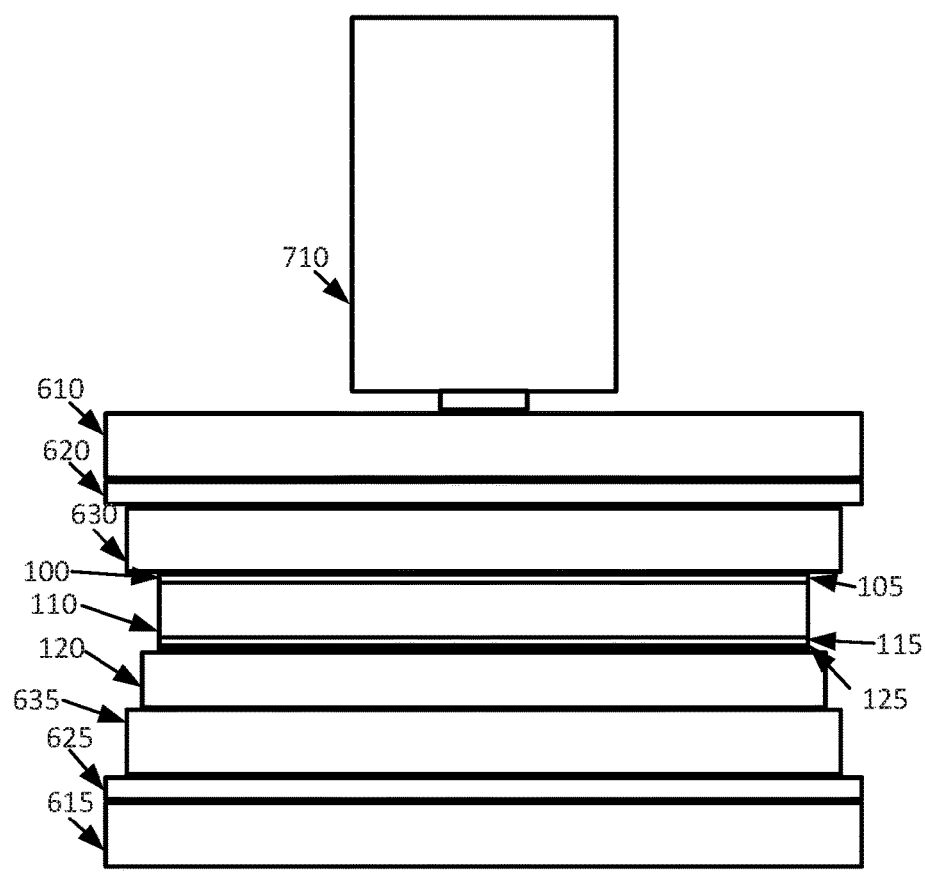
FIG. 8 shows an example laminate material bonding stack according to an implementation of the disclosed subject matter.

FIG. 8 shows an example laminate material bonding stack according to an implementation of the disclosed subject matter. Pressure may be applied to the laminate material by a pressure providing device through the compliant material and the non-compliant material on the laminate material 100. The pressure providing device may be any suitable mechanism for applying a controlled level of pressure to the stack through, for example, either or both of the steel plates 610 and 615. For example, the pneumatic cylinder 710 may be used to provide any suitable amount of pressure to the steel plate 610, which may apply the pressure to the stack, including to the laminate material 100, pressing the active layer 110 towards the active layer 110 and the conductive epoxy 125. In some implementations, pressure may be applied through the steel plate 615 in addition to or in lieu of the pressure applied through the steel plate 610. The amount of pressure provided may be, for example, 1 atmosphere, and may be vary from 0.1 atmospheres to 5 atmospheres. The hard neoprene rubber sheets 620 and 625 may help ensure the planarity of the force applied by the steel plate 610 to the quartz plate 630 and laminate material 100. The pressure provided by the pneumatic cylinder may be low enough that the grains of a piezoceramic material of the active layer 110 may not separate from the surface of the active layer 110 while under pressure.

The laminate material 100 may be left under pressure at room temperature for the curing time of the conductive epoxy 125. For example, pneumatic cylinder may maintain 1 atmosphere of pressure provided through the steel plate 610 to the laminate material 100 for any suitable amount of time based on the curing time of the conductive epoxy 125. After the curing time has elapsed, the pressure may be relieved and the laminate material 100 may be removed. The conductive epoxy 125 may have been cured, and may have formed a bond between the active layer 110 and the passive layer 120, adhering the bottom electrode 115 to the surface of the passive layer 120, resulting in a bonded laminate material 100.

In some implementations, the laminate material 100 may be exposed to elevated temperatures while under pressure, reducing the curing time of the conductive epoxy 125. The laminate material 100 may be exposed to elevated temperatures that are lower than the Curie temperature of the material of the active layer 110, for example, to avoid depoling of a piezoceramic material. The laminate material 100 may be exposed to the elevated temperatures during the entire curing time of the conductive epoxy 125, or may be exposed to the elevated temperatures at the end of the cure cycle, shortening the curing time of the conductive epoxy 125 towards the end of the curing.

Figure 9:
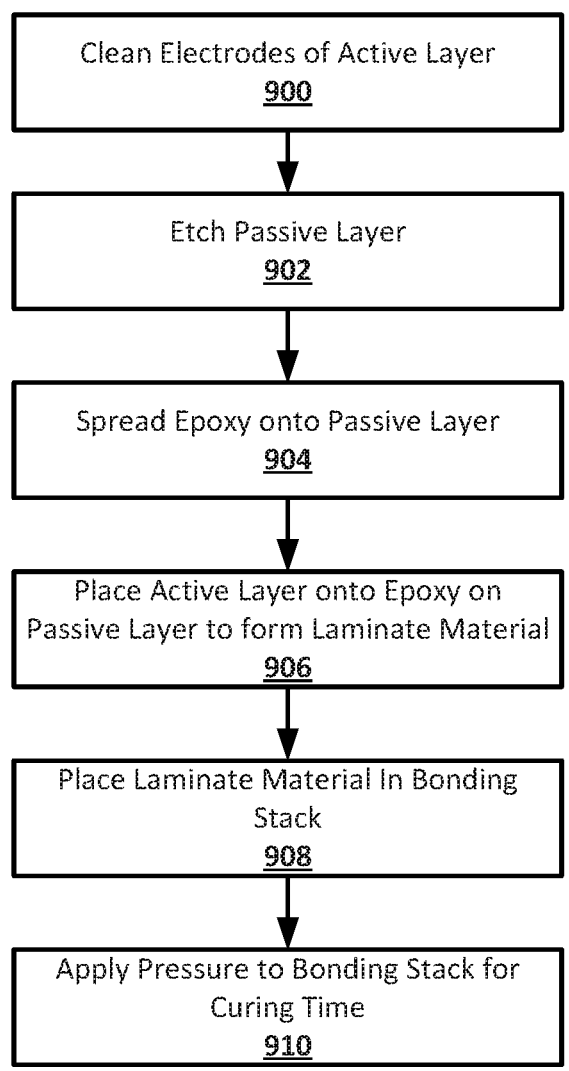
FIG. 9 shows a process suitable for laminate material bonding according to an implementation of the disclosed subject matter.

FIG. 9 shows a process suitable for laminate material bonding according to an implementation of the disclosed subject matter. At 900, the electrodes of an active layer may be cleaned. For example, the top electrode 105 and bottom electrode 115, which may be gold, of the active layer 110, which may be a piezoceramic material, may be degreased and cleaned using any suitable solvents. The solvents may be, for example, acetone, methanol, and isopropanol.

At 902, a passive layer may be etched. For example, the passive layer 120, which may be aluminum, may be etched in any suitable manner. The passive layer 120 may be etched, for example, using hydrochloric acid, with a 20% chromic acid bath of 10 to 40 minutes. Etching the passive layer 120 may allow for better adhesion by the conductive epoxy 125. In some implementations, the passive layer 120 may be abraded with sandpaper, steel wool, an abrasive cleaning pad, or other abrasive in addition to the acid etched. In some implementations, a metal film may be deposited onto the surface of the passive layer 120 to eliminate the acid etch.

At 904, epoxy may be spread onto the passive layer. For example, the stencil 200 may be placed on the surface of the passive layer 120. The conductive epoxy 125 may be applied to the passive layer 120 through the aperture of the stencil 200, for example, using a solid straight edge or rubber-backed squeegee. Other stencil types, with additional apertures, such as the stencils 300 and 310, may be used instead of the stencil 200. The conductive epoxy 125 may applied with even thickness on the passive layer 120. The thickness of the application of the conductive epoxy 125 may be controlled by the thickness of the stencil 200. The stencil 200 may be removed after the conductive epoxy 125 is applied to the passive layer 120.

At 906, the active layer may be placed on the epoxy on the passive layer to form the laminate material. For example, the active layer 110 may be placed on the conductive epoxy 125 applied to the passive layer 120. The active layer 110 may be placed in any suitable manner, including, for example, using a vacuum pickup tool or SMD suction cup. Light pressure may be applied to ensure that the bottom electrode 115 of the active layer 110 makes adequate contact with the conductive epoxy 125.

At 908, the laminate material may be placed in a bonding stack. For example, the laminate material 100, with uncured conductive epoxy 125, may be placed in between the quartz plates 630 and 635, which may be in between the hard neoprene rubber sheets 620 and 625, which may be in between the steel plates 610 and 615. Talcum powder may be placed between the quartz plate 630 and the hard neoprene rubber sheet 620 and between the quartz plate 635 and the hard neoprene rubber sheet 625. The bonding stack may rest on the steel plate 615, which may be a part of, or attached to, the bottom of a press. The steel plate 610 may rest on top of the hard neoprene rubber sheet 620, or may be held above the hard neoprene rubber sheet 620, for example, by attachment to the pneumatic cylinder 710.

At 910, pressure may be applied to the bonding stack for the curing time of the epoxy. For example, the pneumatic cylinder 710 may provide 1 atmosphere of pressure which may be applied to the bonding stack through the steel plate 610. The pressure may push the active layer 110 towards the passive layer 120, compressing the laminate material 100. The laminate material 100 may be left under pressure for the curing time of the conductive epoxy 125, which may be, for example, 24 to 48 hours at room temperature. In some implementations, the laminate material 100 may be exposed to elevated temperatures lower than the Curie temperature of the material of the active layer 110, for example, 90 degrees Celsius, which may reduce the curing time of the conductive epoxy 125. After the conductive epoxy 125 has cured, the laminate material 100 may be bonded, and pressure may be removed from the laminate material. The thickness of the bond created by the curing of the conductive epoxy 125 may be even across the bond, and may thicker than the maximum particle size of the conductive epoxy 125.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   placing a laminate material comprising first layer, a bonding agent, and a second layer, between a first piece of non-compliant material and a second piece of non-compliant material;
   placing a first piece of compliant material such that it is in contact with the first piece of non-compliant material;
   placing a second piece of compliant material such that is in contact with the second piece of non-compliant material; and
   applying pressure to the laminate material by applying pressure to at least the first piece of compliant material for a curing time of the bonding agent,
   wherein there is no bonding agent between the first piece of compliant material and the first piece of non-compliant material, and no bonding agent between the second piece of compliant material and the second piece of non-compliant material.

2. The method of claim 1, further comprising placing the first piece of compliant material in contact with a first steel plate and the second piece of compliant material in contact with a second steel plate.

3. The method of claim 2, wherein the first steel plate is attached to a pressure providing device, and wherein applying pressure to at least the first piece of compliant material for a curing time of the laminate material further comprises using the pressure providing device to provide pressure to the first piece of compliant material through the first steel plate.

4. The method of claim 1, further comprising placing talcum powder between the first piece of non-compliant material and the first piece of compliant material, and between the second piece of non-compliant material and the second piece of compliant material.

5. The method of claim 1, wherein the first piece of non-compliant material and the second piece of non-compliant material are quartz plates.

6. The method of claim 1, wherein the first piece of compliant material and the second piece of compliant material are neoprene rubber sheets.

7. A method comprising:
   forming a bonding stack comprising a laminate material, a first quartz plate, a second quartz plate, a first neoprene rubber sheet, and a second neoprene rubber sheet by:
      placing the second quartz plate on top of the second neoprene rubber sheet,
      placing the laminate material on top of the second quartz plate,
      placing the first quartz plate on top of the laminate material, and
      placing the first neoprene rubber sheet on top of the first quartz plate; and
   applying pressure to the laminate material by applying pressure to the first neoprene rubber sheet for a curing time of a conductive epoxy that is part of the laminate material,
   wherein there is no bonding agent between the first neoprene rubber sheet and first quartz plate, and no bonding agent between the second neoprene rubber sheet and the second quartz plate.

8. The method of claim 7, wherein the bonding stack is placed between a first steel plate and a second steel plate.

9. The method of claim 7, wherein the first steel plate is attached to a pressure providing device, and wherein applying pressure to the laminate material by applying pressure to the first neoprene rubber sheet for a curing time of the conductive epoxy further comprises using the pressure providing device to provide pressure to the first neoprene rubber sheet through the first steel plate.

10. The method of claim 7, further comprising placing talcum powder between the first quartz plate and the first neoprene rubber sheet, and between the second quartz plate and the second neoprene rubber sheet.

\* \* \* \* \*